US008571153B2

(12) United States Patent
Abraham (10) Patent No.: US 8,571,153 B2
(45) Date of Patent: *Oct. 29, 2013

(54) METHOD AND APPARATUS FOR MITIGATING INTERFERENCE IN A SATELLITE SIGNAL RECEIVER

(75) Inventor: Charles Abraham, Los Gatos, CA (US)

(73) Assignee: Global Locate, Inc., Irvine, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 12/759,816

(22) Filed: Apr. 14, 2010

(65) Prior Publication Data

US 2010/0203827 A1 Aug. 12, 2010

Related U.S. Application Data

(63) Continuation of application No. 10/455,234, filed on Jun. 5, 2003, now Pat. No. 7,724,846.

(51) Int. Cl.
*H04B 1/10* (2006.01)

(52) U.S. Cl.
USPC ........... 375/346; 375/144; 375/148; 375/348; 455/3.02; 455/1; 455/63.1; 455/114.2; 455/296

(58) Field of Classification Search
USPC ............. 375/346, 144, 148, 348; 455/3.02, 1, 455/63.1, 114.2, 296
See application file for complete search history.

(56) References Cited

U.S. PATENT DOCUMENTS

| | | | |
|---|---|---|---|
| 5,120,997 A * | 6/1992 | Cantwell | 327/79 |
| 5,577,025 A | 11/1996 | Skinner et al. | |
| 5,722,061 A * | 2/1998 | Hutchison et al. | 455/245.1 |
| 6,107,960 A * | 8/2000 | Krasner | 342/357.59 |
| 6,526,322 B1 * | 2/2003 | Peng et al. | 700/5 |
| 7,724,846 B2 | 5/2010 | Abraham | |
| 2001/0002203 A1 | 5/2001 | Cahn et al. | |
| 2002/0077074 A1 * | 6/2002 | Piazza | 455/343 |
| 2003/0206575 A1 | 11/2003 | Bertrand et al. | |
| 2004/0095274 A1 * | 5/2004 | Warloe et al. | 342/357.12 |

FOREIGN PATENT DOCUMENTS

WO WO 2004/109935 12/2004

OTHER PUBLICATIONS

Dantoni et al, "A highly integrated GPS receiver for cellular handset", 2001 IEEE Radio Frequency Integrated Circuits (RFIC) Symposium, Digest of Papers, Phoenix, AZ May 20-22, 2001, New York, NY pp. 93-96.

Invitation to Pay Additional Fees dated Oct. 18, 2004 from corresponding PCT application PCT/US2004/017274.

(Continued)

*Primary Examiner* — Leila Malek
(74) *Attorney, Agent, or Firm* — Sterne, Kessler, Goldstein & Fox P.L.L.C.

(57) ABSTRACT

A method and apparatus for mitigating interference in a satellite signal receiver is described. The satellite signal receiver receives satellite signals from a plurality of satellites. In one example, a control signal is transmitted to the satellite signal receiver upon occurrence of data transmission from a wireless transceiver operating in proximity to the satellite signal receiver. Signal integration within the satellite signal receiver is gated in response to the control signal. In another example, one or more values of satellite signal samples are selected from a plurality of possible values. Signal integration within the satellite signal receiver is gated in response to a percentage of satellite signal samples taken over a predefined period exceeding a predefined threshold. In yet another example, a gain setting of an automatic gain control circuit within the satellite signal receiver is adjusted in response to detection of interference.

21 Claims, 10 Drawing Sheets (56) References Cited

OTHER PUBLICATIONS

International Search Report mailed Dec. 21, 2004 for PCT Application No. PCT/US2004/017274, "Written Opinion of the International Search Authority," mailed Dec. 21, 2004 for PCT Application No. PCT/US2004/017274.
"Written Opinion of the International Search Authority," issued Dec. 8, 2005 for PCT Application No. PCT/US2004/017274.

* cited by examiner

METHOD AND APPARATUS FOR MITIGATING INTERFERENCE IN A SATELLITE SIGNAL RECEIVER

BACKGROUND OF THE INVENTION

1. Field of the Invention

The present invention generally relates to a satellite signal receivers and, more particularly, to mitigating interference in global positioning system (GPS) receivers.

2. Description of the Related Art

The use of portable personal communication devices, such as cellular telephones and pagers, has increased dramatically in recent years. Likewise, the use of portable navigational devices, such as global positioning system (GPS) receivers, has increased as such devices have become more widely available. Recent technological developments have allowed the integration of satellite signal receivers and communication systems within combined units to produce location-enabled mobile devices. For example, cellular telephones are now produced that include integrated GPS receivers.

GPS receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance, or "pseudorange", from the receiver to each of the satellites that are in view of the receiver. The GPS satellites transmit satellite-positioning data to the receivers, which is referred to as "ephemeris" data. The receiver uses the ephemeris data, along with absolute time information, to calculate where each satellite was when it transmitted a signal. Finally, the receiver combines the knowledge of satellite positions with the pseudoranges to the satellites to compute the receiver position.

More specifically, GPS receivers receive GPS signals transmitted from orbiting GPS satellites containing unique pseudo-random noise (PN) codes. Each satellite transmits a unique PN code (known as the C/A code) that identifies the particular satellite, and allows signals transmitted simultaneously from several satellites to be received simultaneously by a receiver with very little interference of any one signal by another. The GPS receivers determine the time delays between transmission and reception of the satellite signals by comparing time shifts between the received PN code signal sequence and internally generated PN signal sequences ("reference PN codes"). The comparison process between a received PN code and a reference PN code is referred to as a "correlation" process. The PN code sequence length is 1023 chips, corresponding to a 1 millisecond time period. One cycle of 1023 chips is called a PN frame. Each received GPS signal is constructed from the 1.023 MHz repetitive PN pattern of 1023 chips. At very low signal levels, the PN pattern may still be observed, to provide unambiguous time delay measurements, by processing, and essentially averaging, many PN frames. The averaging of multiple PN frames is referred to as "integration".

To further enhance the reception characteristics, some GPS receivers may use "aiding" data that is transmitted to the mobile device. The aiding information is transmitted to the GPS receiver using some alternative form of communication (usually wireless, such as cellular data channels). By using aiding data, GPS receivers can operate in areas where signal levels are too low for traditional GPS to function properly.

One disadvantage inherent in many location-enabled mobile devices is the decreased performance of the satellite signal receiver section of the combined unit. A common cause for this decreased performance is signal interference between the wireless receiver section and the satellite signal receiver section. For example, in a combination cellular telephone/GPS receiver, cellular transmissions from the cellular telephone receiver section may generate interference that reduces the performance of the GPS receiver section. The satellite signal receiver section of the combined unit may also exhibit decreased performance due to signal interference between other wireless devices that are transmitting wireless signals in proximity to the combined unit.

One approach to overcoming cross-interference between wireless receiver and satellite signal receiver sections of a combined device involves disabling the "front end" of the satellite signal receiver when the wireless receiver is transmitting a signal. The front end is the portion of the satellite signal receiver that produces baseband signals from the received RF satellite signals for processing by a correlator. Another approach to overcoming cross-interference between wireless receiver and satellite signal receiver sections of a combined device involves disabling all satellite signal processing within the satellite signal receiver.

Disabling the front end of the satellite signal receiver, however, deleteriously affects the signal correlation process. Notably, the correlator will continue correlating even in the absence of baseband signals, which corrupts the correlation results with noise. In addition, in some cases, the wireless receiver section may be transmitting a low power signal such that the interference between the wireless receiver section and the satellite signal receiver section is minimal. In such cases, it is disadvantageous to disable the front end of the satellite signal receiver section, or all processing within the satellite signal receiver section, since signal correlation is unnecessarily suspended until the disabled circuitry is enabled.

Therefore, there exists a need in the art for a method and apparatus that mitigates interference in a satellite signal receiver without unnecessarily disabling circuitry within the satellite signal receiver.

SUMMARY OF THE INVENTION

The disadvantages associated with the prior art are overcome by a method and apparatus for mitigating interference in a satellite signal receiver section of a device having a wireless transceiver and a satellite signal receiver section. The satellite signal receiver receives satellite signals from a plurality of satellites. In one embodiment of the invention, data transmission of a wireless transceiver operating in proximity to the satellite signal receiver is monitored. A control signal is transmitted to the satellite signal receiver upon occurrence of data transmission from the wireless transceiver. Signal integration within the satellite signal receiver is then gated in response to the control signal.

In another embodiment of the invention, one or more values of satellite signal samples are selected from a plurality of possible values. A percentage of satellite signal samples having the one or more selected values is monitored over a predefined period. Signal integration within the satellite signal receiver is gated in response to the percentage exceeding a predefined threshold.

In another embodiment of the invention, gain within a satellite signal receiver is controlled. Data transmission of a wireless transceiver operating in proximity to the satellite signal receiver is monitored. A control signal is transmitted to an automatic gain control circuit within the satellite signal receiver upon occurrence of data transmission from the wireless transceiver. A gain setting of the automatic gain control circuit is adjusted in response to the control signal.

In yet another embodiment, gain within a satellite signal receive is controlled by selecting one or more values of satellite signal samples from a plurality of possible values. A percentage of satellite signal samples having the one or more selected values is monitored over a predefined period. A gate signal is transmitted to an automatic gain control circuit within the satellite signal receiver in response to the percentage exceeding a predefined threshold. A gain setting of the automatic gain control circuit is adjusted using the gate signal.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

A method and apparatus for mitigating interference in a satellite signal receiver is described. One or more aspects of the invention relate to mitigating interference in a global positioning system (GPS) receiver integrated within a cellular telephone. Those skilled in the art will appreciate that the invention may be used within other types of mobile or wireless devices that are location-enabled, such as pagers, laptop computers, personal digital assistants (PDAs), and like type wireless devices known in the art. In addition, while the location of the mobile device is facilitated by processing GPS satellite signals, other satellite based systems may be used, such as GLONASS, GALIEO, and the like.

Figure 1:
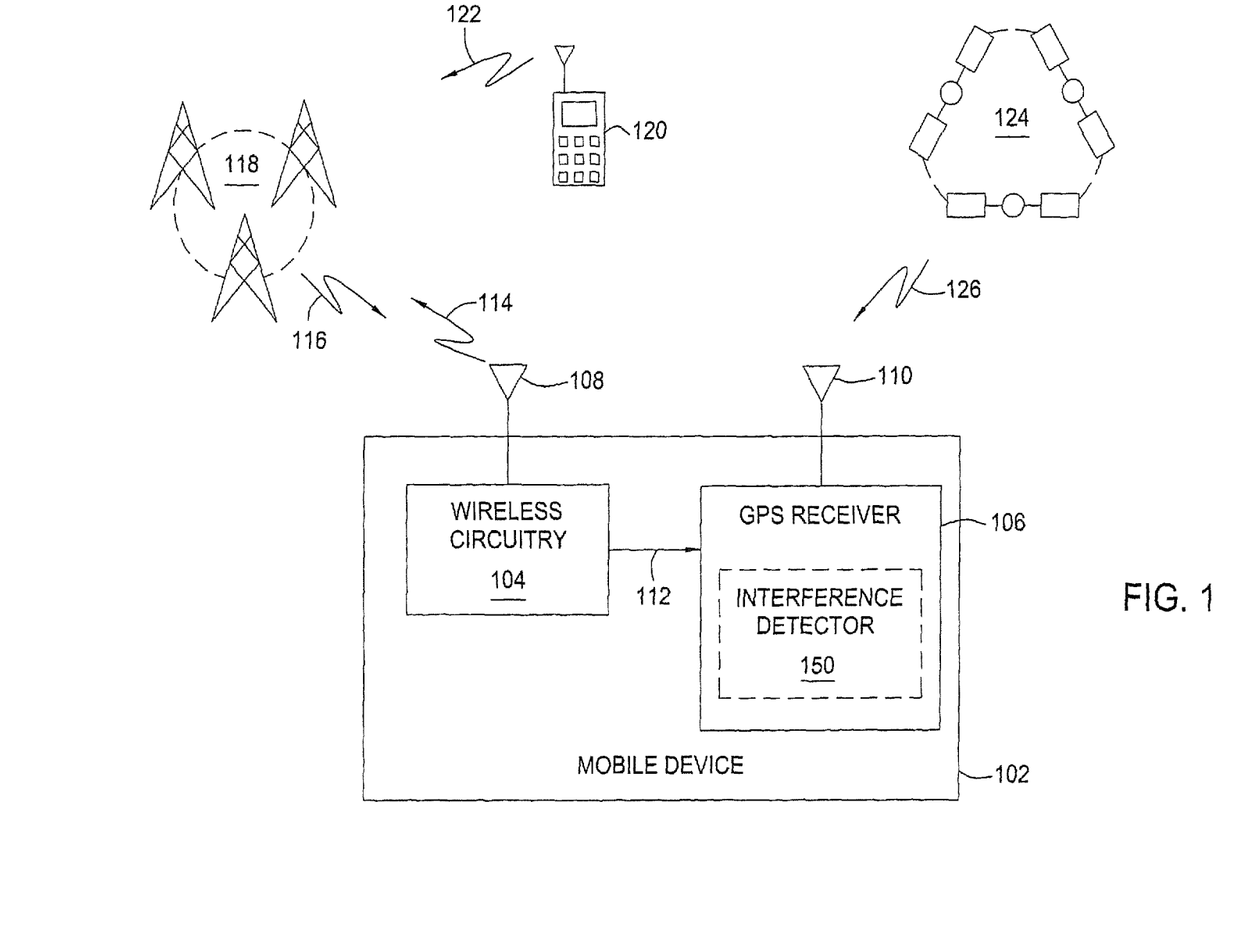
FIG. 1 depicts a high-level block diagram showing one embodiment of a mobile device in accordance with the invention.

FIG. 1 depicts a high-level block diagram showing one embodiment of a mobile device 102 in accordance with the invention. The mobile device 102 comprises wireless circuitry 104 coupled to an antenna 108, and a GPS receiver 106 coupled to an antenna 110. The wireless circuitry 104 may communicate with a wireless communication system 118 using the antenna 108. The wireless circuitry 104 transmits wireless signals 114 to the wireless communication system 118, and receives wireless signals 116 from the wireless communication system 118. For example, the wireless circuitry 104 may receive and transmit cellular telephone signals. In addition, the wireless circuitry 104 may receive GPS aiding information.

The GPS receiver 106 receives satellite signals 126 from orbiting satellites 124 using the antenna 110. The GPS receiver 106 downconverts each of the satellite signals 126 to a baseband signal, and multiplies each baseband signal by a stored replica of the appropriate pseudorandom reference code to produce a signal correlation. By observing the magnitude of the signal correlation, the GPS receiver 106 determines a pseudorange. In order to increase the signal-to-noise ratio, a successive set of signal correlations are accumulated over a predefined interval in a process referred to as "signal integration". Coherent signal integration refers to the accumulation of signal correlations before the magnitude detection process. Non-coherent signal integration refers to the accumulation of magnitudes. The term "signal integration" as used herein is intended to encompass both coherent integration and non-coherent integration. The GPS receiver 106 may be a conventional receiver, as described in U.S. Pat. No. 4,968,891 (issued Nov. 6, 1990), or an assisted GPS receiver, as described in commonly-assigned U.S. Pat. No. 6,453,237 (issued Sep. 17, 2002), each of which are incorporated by reference herein in their entireties. The term "GPS receiver" as used herein is intended to encompass both conventional GPS receivers and assisted GPS receivers.

The received satellite signals 126 typically exhibit low signal levels with respect to background noise. As such, interference caused by other wireless signals may deleteriously affect the performance of the GPS receiver 106. For example, the wireless signals 114 transmitted by the wireless circuitry 104 may interfere with reception of the satellite signals 126 ("cross-interference"). Cross-interference between the wireless signals 114 and the satellite signals 126 may occur due to a limited amount of isolation between the antenna 108 coupled to the wireless circuitry 104, and the antenna 110 coupled to the GPS receiver 106. In another example, wireless signals 122 transmitted by another mobile device 120 may interfere with reception of the satellite signals 126 ("neighborhood interference").

In one embodiment of the invention, the wireless circuitry 104 provides a control signal 112 to the GPS receiver 106. The control signal 112 includes information indicative of whether or not the wireless circuitry 104 is transmitting a signal via the antenna 108. If the wireless circuitry 104 is transmitting a signal via the antenna 108, the GPS receiver 106 does not perform the signal integration process. For example, in time division multiple access (TDMA) wireless systems, such as the Global System for Mobile Communications (GSM), the wireless circuitry 104 periodically transmits a burst of data (i.e., the transmitted signal is pulsed). As such, interference between the wireless circuitry 104 and the GPS receiver 106 is momentary (i.e., interference may result during transmission of each data burst). In between each burst of data, there is no interference between the wireless circuitry 104 and the GPS receiver 106. In general, the wireless circuitry 104 "transmits a signal" if the antenna 108 coupled to the wireless circuitry 104 radiates RF energy.

The signal integration process is re-enabled when the wireless circuitry completes the signal transmission. Thus, the signal integration process is "gated" when the wireless circuitry 104 is transmitting a signal via the antenna 108. As such, the signal correlations produced by the GPS receiver 106 during intervals when the wireless circuitry 106 is transmitting a signal are not accumulated with previous signal correlations. In this manner, the invention increases the signal-to-noise ratio of the correlation results, since corrupted correlations are not used in the signal integration process. In addition, the invention does not unnecessarily disable all satellite signal processing within the GPS receiver 106, but rather gates only the signal integration process during the interference condition. That is, all other circuits within the GPS receiver 106 remain operable except the signal integration circuits.

In another embodiment of the invention, an interference detector 150 is embedded within the GPS receiver 106. The interference detector 150 may be used to detect interference within the satellite signals 126. In one embodiment, the interference detector 150 operates autonomously and may be used to detect interference in the satellite signal, such as cross-interference or neighborhood interference. If the interference detector 150 detects interference, the GPS receiver 106 gates the signal integration process. In another embodiment, the interference detector 150 operates in conjunction with the control signal 112. For example, the signal integration process may be gated if both the interference detector 150 detects interference and the control signal indicates that the wireless circuitry 104 is transmitting a signal. In another example, the signal integration process may be gated if either the interference detector 150 detects interference or the control signal indicates that the wireless circuitry is transmitting a signal.

Figure 2:
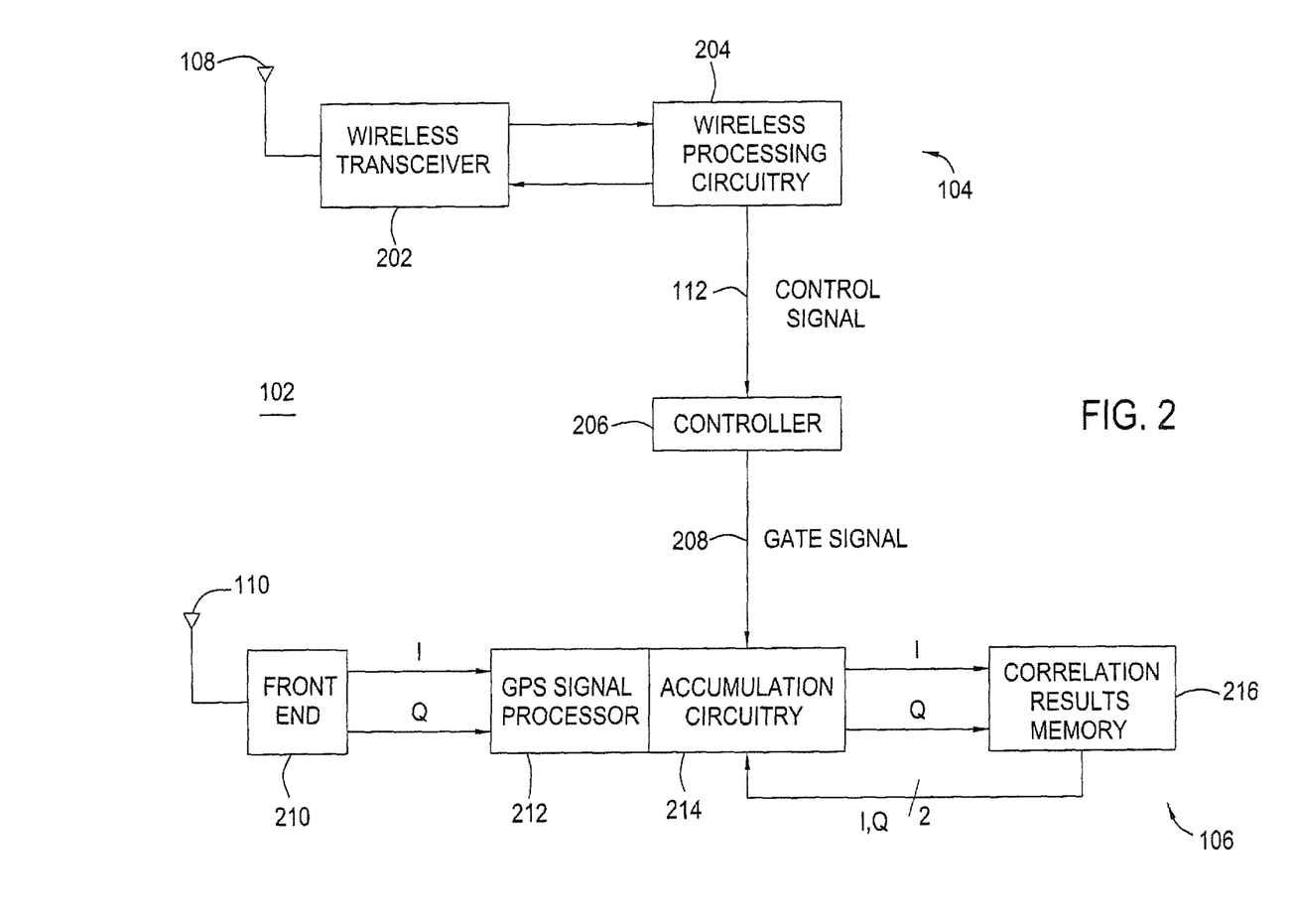
FIG. 2 depicts a more detailed block diagram showing one embodiment of the mobile device in accordance with the invention.

FIG. 2 depicts a more detailed block diagram showing one embodiment of the mobile device 102 in accordance with the invention. Elements of FIG. 2 that are the same or similar to those depicted in FIG. 1 are designated with identical reference numerals. The GPS receiver 106 comprises a front end 210, a GPS signal processor 212, accumulation circuitry 214, controller 206, and correlation results memory 216. The wireless circuitry 104 comprises a wireless transceiver 202 and wireless processing circuitry 204. The wireless transceiver 202 receives wireless signals using the antenna 108 and demodulates the wireless signals to provide baseband wireless signals. The wireless processing circuitry 204 processes the baseband wireless signals to obtain the transmitted data. If a transmission is required, the wireless processing circuitry 204 generates that data to be transmitted and produces baseband samples of the data. The wireless transceiver 202 modulates a carrier signal with the baseband data and transmits a wireless signal using the antenna 108. Operation of the wireless transceiver 202 and the wireless processing circuitry 204 is well known in the art.

The front end 210 receives satellite signals using the antenna 110 and demodulates the satellite signals to provide baseband signals in a well-known manner. In one embodiment, front end 210 provides both in-phase (I) and quadrature phase (Q) baseband signals. The GPS signal processor 212 correlates the I and Q baseband signals with pseudorandom reference codes to produce I and Q signal correlations. The I and Q signal correlations are accumulated with other I and Q signal correlations using the accumulation circuitry 214, and are stored in the correlation results memory 216. For purposes of clarity by example, the front end 210 is described as performing quadrature demodulation of GPS signals. It is to be understood, however, that the front end 210 may perform non-quadrature demodulation of the GPS signals and provide a single baseband signal to be processed by the GPS signal processor 212.

The wireless processing circuitry 204 provides the control signal 112 to the controller 206. The control signal 112 includes information indicative of the transmission state of the wireless transceiver 202. For example, the control signal 112 may have two states, where one state indicates that the wireless transceiver 202 is transmitting a wireless signal using the antenna 108, and another state indicates that the wireless transceiver 202 is not currently transmitting a wireless signal ("binary state control signal"). Alternatively, the control signal 112 may be a digital word that indicates the power of the signal being transmitted by the wireless transceiver 202.

The controller 206 produces a gate signal 208 in response to the control signal 112. The gate signal 208 is coupled to the accumulation circuitry 214 and controls whether or not the accumulation circuitry 214 accumulates signal correlations produced by the GPS signal processor 212. For example, if the control signal 112 is a binary state control signal, the controller 206 monitors the state of the control signal 112. If the state of the control signal 112 indicates that the wireless transceiver 202 is transmitting a wireless signal, the controller 206 gates the accumulation circuitry 214. If the state of the control signal 112 indicates that the wireless transceiver 202 is not currently transmitting a wireless signal, the controller 206 does not gate the accumulation circuitry 214. Alternatively, if the control signal 112 is a digital word indicative of the power of the signal being transmitted, the controller 206 may gate the accumulation circuitry 214 if the signal power is above a predefined threshold. Otherwise, the controller 206 does not gate the accumulation circuitry 214. By selectively gating the accumulation circuitry 214 during an interference condition, the invention advantageously gates the signal integration process when signal correlations produced by the GPS signal processor 212 may be corrupted by noise due to cross-interference.

Figure 7:
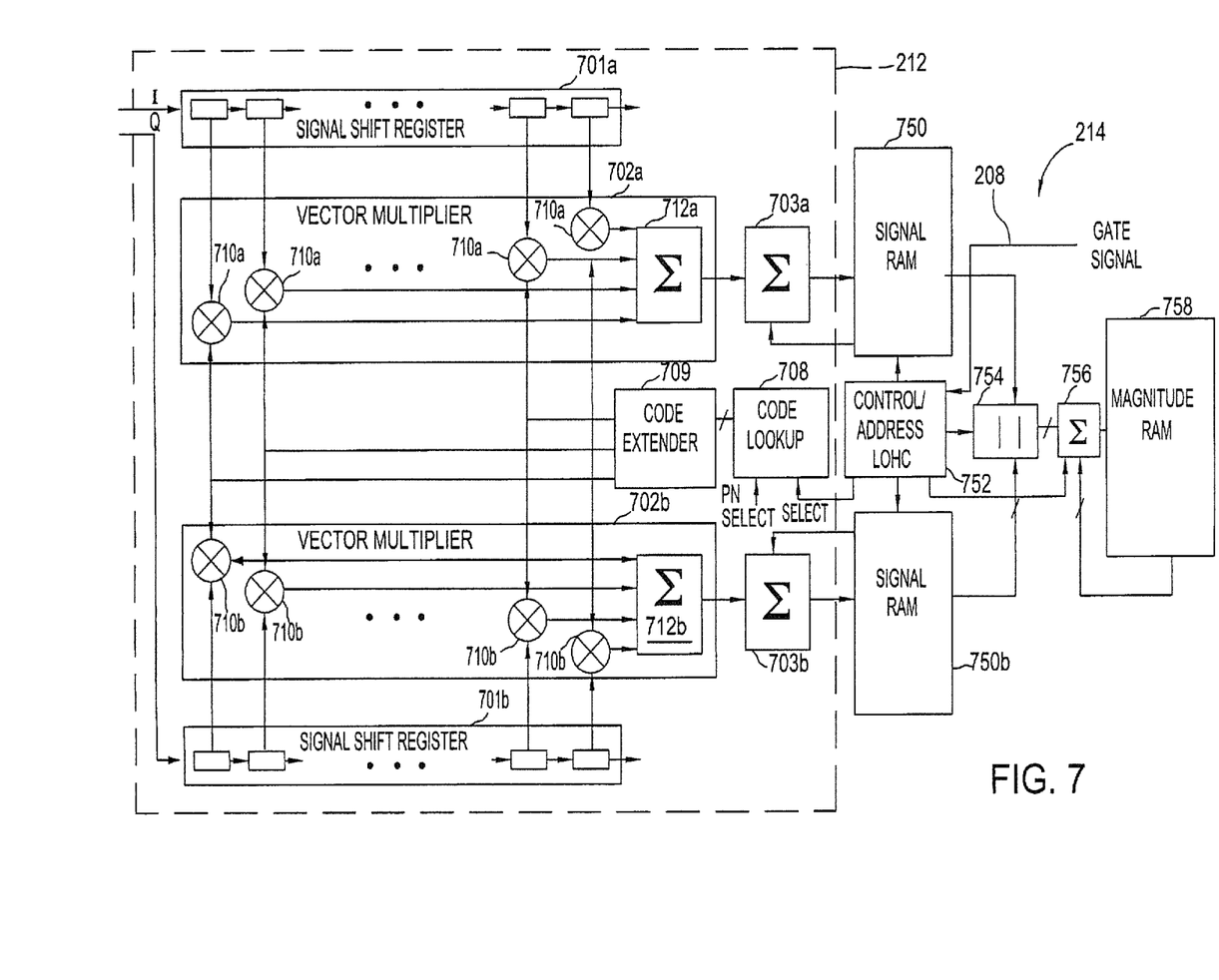
FIG. 7 depicts a detailed block diagram showing an exemplary embodiment of a GPS signal processor and accumulation circuitry.

FIG. 7 is a detailed block diagram depicting an exemplary embodiment of GPS signal processor 212 and accumulation circuitry 214. The GPS signal processor 212 comprises signal shift registers 701a and 701b (collectively referred to as signal shift registers 701), vector multipliers 702a and 702b (collectively referred to as vector multipliers 702), adders 703a and 703b (collectively referred to as adders 703), a code extender 709, and code lookup table 708. The vector multipliers 702a and 702b respectively comprise multipliers 710a and 710b, and adders 712a and 712b. The accumulation circuitry 214 comprises signal RAM 750a and 750b (collectively referred to as signal RAM 750), control/address logic 752, complex normalizer 754, adder 756, and magnitude RAM 758.

In operation, I and Q signals from the front end 210 are coupled to the shift registers 701a and 701b, respectively. Each of the shift registers 701 is of length P×K, where P is the desired number of samples per C/A code chip, and K is chosen as a design parameter (K is a factor of 1023). For purposes of clarity by example, the remainder of the discussion focuses on one particular embodiment with P=2 (samples spaced ½ chip apart) and K=33.

Signals advance through the shift registers 701 at a predefined rate. The signals remain in place in the shift registers 701 for many clock cycles, so that a series of partial correlation operations can be performed. Specifically, a total of M partial correlations are performed, where M=1023/K or 31 in this example. Each partial correlation consists of a fast vector multiply-and-add operation between the contents of each of the shift registers 701 and a segment of the code containing P×K (e.g., 66) code samples. The fast vector multiplication and addition occurs in the vector multipliers 702. The operation consists of multiplying each of the 66 signal samples in the shift register 701a or 701b by 66 code samples (formed by extending 33 code samples with the code extender 709), and summing the results in adder 712a and 712b. The operation occurs separately and simultaneously in the I and Q channels. Mathematically, this operation is referred to as an inner product, defined as $$\sum_{i=1}^{P \times K} \langle signal_i \rangle \langle code\ c_i \rangle$$

The output of the vector multiply-and-add may be re-quantized to keep the numbers in a small range so as to avoid overflowing RAMs 750a and 705b of the accumulation circuitry 214.

The code lookup circuit 708 generates the reference code samples for each partial correlation. The lookup is controlled by two lookup indexes. First, the code must be selected from 1 of 32 codes. This selection is constant through the correlation process and is established when the processing channel is configured to correlate for a particular satellite signal. The second index is a segment index between 1 and M. Each C/A code consists of 1023 chips, which are divided into M non-overlapping segments each consisting of K adjacent code chips. The lookup index identifies which code segment is needed. The output from the code lookup circuit is K chips comprising the segment. The selection process is controlled by the Control/Address Logic 752.

The code extender 709 takes as its input K chips of a segment and extends the segment into K×P code samples. The extension operation consists of converting each code chip into P identical code samples. The output from the code extender 709 forms the reference code input to vector multipliers 702. In the example, the output from the code extender 709 is 66 samples made up of 33 unique values, each replicated twice.

The results of the vector multiply-and-add are accumulated by adders 703a and 703b and processed by the accumulation circuitry 214. The accumulation process consists of reading from RAM 750a and 750b the current values for a particular time delay, adding the just computed partial correlations, and writing the sums back to RAMs 750a and 750b. By properly combining partial correlations that correspond to a particular time delay, the full correlation for that delay is computed. The process continues for as many epochs of the signal as desired to enhance signal to noise ratio (i.e., coherent signal integration). The control/address logic 752 identifies the correct addresses for the RAMs 750a, 750b. Thus, the adders 703a and 703b serve two purposes: the combining of partial correlations within an epoch; and the accumulation of correlations across several epochs. Responsive to the gate signal 208, the control/address logic 752 may turn off adders 703 such that the coherent integration process is gated (i.e., signal RAMs 750a and 750b would not accumulate correlation results).

The outputs from the signal RAMs 750a and 750b are combined in complex normalizer 754 to form the magnitude of the signal. The I and Q waveforms in these RAMs 750a and 750b can be viewed as the real and imaginary part of a complex waveform. Forming the magnitude consists of squaring each component, summing the results, and taking the square root of the result. There are several approximations to the magnitude that can be used to simplify circuitry. In one embodiment, the complex magnitude is approximated by taking the scalar magnitude of I and Q independently and determining which is larger. The magnitude can be approximated by taking the larger magnitude and adding it to the one half of the smaller magnitude. The results of the magnitude operation may be scaled to keep the values in a small range so as to avoid overflowing RAM 758. For simplicity, a scaler is not shown. In one embodiment, the scaling consists of shifting the result by 3 bits (i.e., divide by 8). In another embodiment, signal powers are accumulated, rather than signal magnitudes. In this case, the operation in 754 would be power estimation, typically computed by taking the sum of the squares of I and Q.

The output from complex normalizer 754 is accumulated by the adder 756 into magnitude RAM 758. The accumulation process consists of reading from RAM 758 the current magnitude value for a particular time delay, adding in the just computed magnitude result, and writing the sum back to the RAM 758. The magnitude accumulation continues for as many cycles as required to achieve signal to noise ratio enhancement (i.e., non-coherent integration). The control/address logic 752 identifies the correct addresses for the magnitude RAM 758. The control/address logic 752 may also turn off the adder 756 such that the non-coherent integration process is gated (i.e., the magnitude RAM 758 would not accumulate the magnitude results). For a detailed understanding of the GPS signal processor and accumulation circuitry, the reader is directed to commonly-assigned U.S. patent application Ser. No. 09/861,086, filed May 18, 2001, which is incorporated by reference in its entirety.

Figure 5:
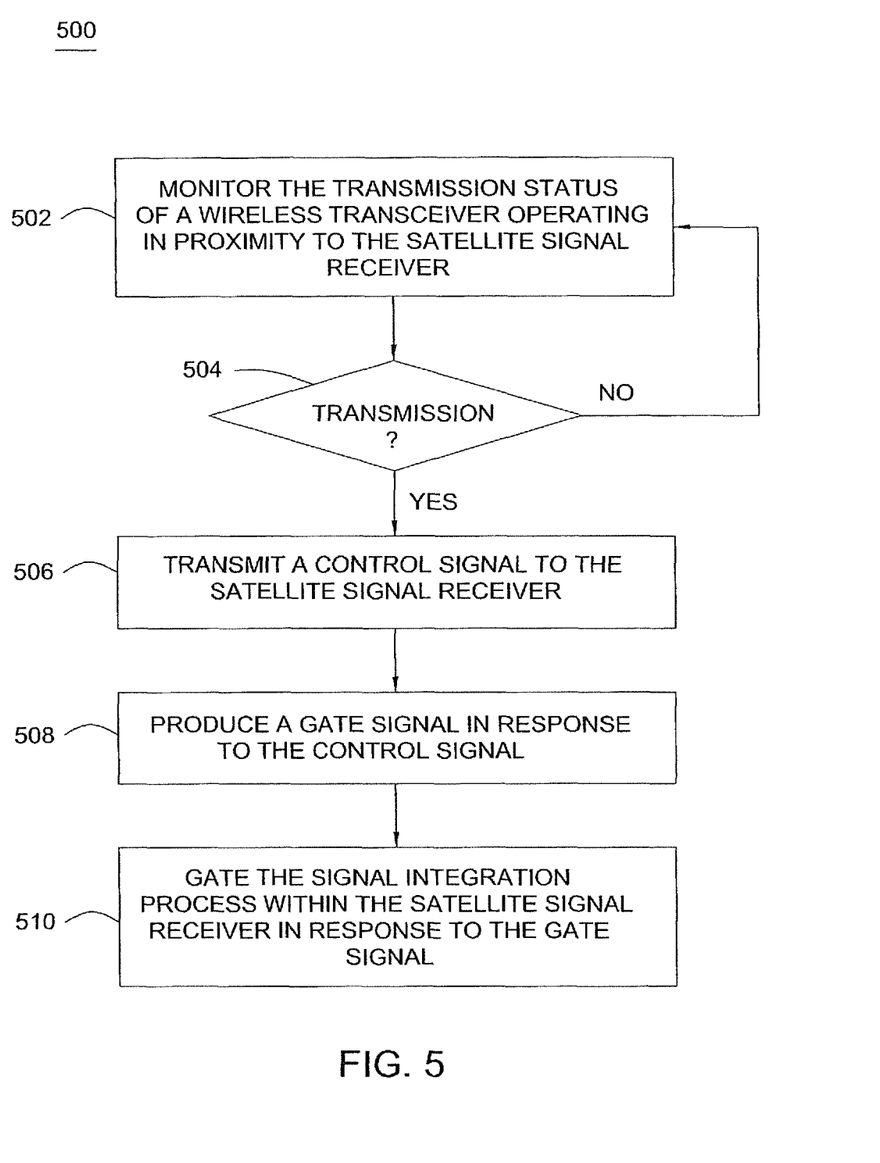
FIG. 5 depicts a flow diagram showing one embodiment of a process for mitigating interference in a satellite signal receiver in accordance with the invention.

FIG. 5 depicts a flow diagram showing one embodiment of a process 500 for mitigating interference in a satellite signal receiver in accordance with the invention. The process 500 begins at step 502, where the transmission status of a wireless transceiver operating in proximity to the satellite signal receiver is monitored. For example, the satellite signal receiver may be integrated within a mobile device having a wireless transceiver. At step 504, a determination is made as to whether the wireless transceiver is transmitting a wireless signal. If not, the process 500 returns to step 502. If the wireless transceiver is transmitting a wireless signal, the process 500 proceeds to step 506.

At step 506, a control signal is transmitted to the satellite signal receiver. In one embodiment, the control signal provides a binary indication that the wireless transceiver is currently transmitting a wireless signal. Alternatively, the control signal provides an indication of the power of the wireless signal currently transmitted by the wireless transceiver. At step 508, a gate signal is produced in response to the control signal. At step 510, the signal integration process within the satellite signal receiver is gated in response to the gate signal produced at step 508. For example, the accumulation circuitry of the satellite signal receiver baseband processing circuitry may be gated such that the signal correlations produced while the wireless transceiver is transmitting, or while the power of the transmitted signal is above a predefined threshold, are not accumulated with previous signal correlations.

Figure 3:
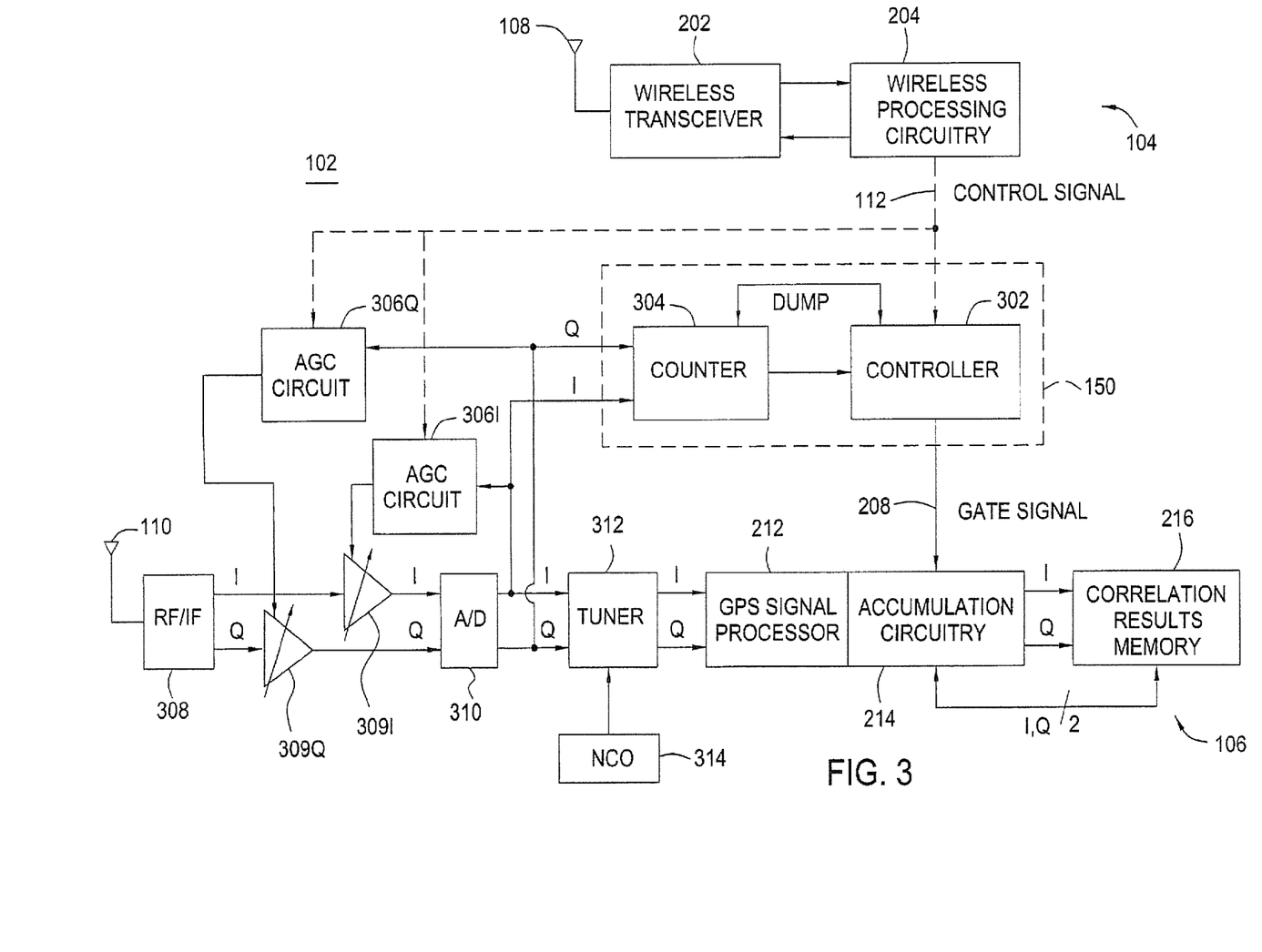
FIG. 3 depicts a more detailed block diagram showing another embodiment of the mobile device in accordance with the invention.

FIG. 3 depicts a more detailed block diagram showing another embodiment of the mobile device 102 in accordance with the invention. Elements of FIG. 3 that are the same or similar to those depicted in FIGS. 1 and 2 are designated with identical reference numerals and are described above. In the present embodiment, the front end 210 comprises an RF/IF converter 308, an amplifier 309I, an amplifier 309Q, an analog-to-digital (ND) converter 310, a tuner 312, a numerically controlled oscillator 314, an automatic gain control (AGC) circuit 306I, and an AGC circuit 306Q. The amplifiers 309I and 309Q are collectively referred to as amplifiers 309, and the AGC circuits 306I and 306Q are collectively referred to as AGC circuits 306. The interference detector 150 comprises a counter 304 and a controller 302. For purposes of clarity by example, the front end 210 includes two amplifiers 309 and two AGC circuits 306 for quadrature processing of GPS signals. It is to be understood, however, that the front end 210 may include only one amplifier 309 and one AGC circuit 306 for non-quadrature processing of GPS signals.

Satellite signals are coupled to the RF/IF converter 308 via the antenna 110. The RF/IF converter 308 downconverts the satellite signals to produce an intermediate frequency (IF) signal having I and Q components. The I and Q components of the IF signal are amplified by respective amplifiers 309I and 309Q. The amplifiers 309 are variable gain amplifiers that adjust the gain of the respective IF signal component to an appropriate level for analog-to-digital conversion. The gain of each of the amplifiers 309 is controlled by a respective one of the AGC circuits 306. The I and Q components of the IF signal are coupled to the N/D converter 310, which samples the IF signal to produce digitized I and Q signals, and quantizes the I and Q signals.

In one embodiment, the digitized I and Q signals are quantized using two bits and the samples of the quantized I and Q signals are represented in sign-magnitude format. That is, each I and Q sample may be one of four possible values, where the most significant bit represents the sign of the sample and the least significant bit represents the magnitude of the sample. The quantized I and Q signals are coupled to the tuner 312 and the respective AGC circuits 306. As described in more detail below, the AGC circuits 306 control the gain of the IF signal via amplifiers 309. The tuner 312 produces baseband I and Q signals using mixing signals from the NCO 314 in a well-known manner. As described above, the baseband I and Q signals are coupled to the GPS signal processor 212.

Figure 4:
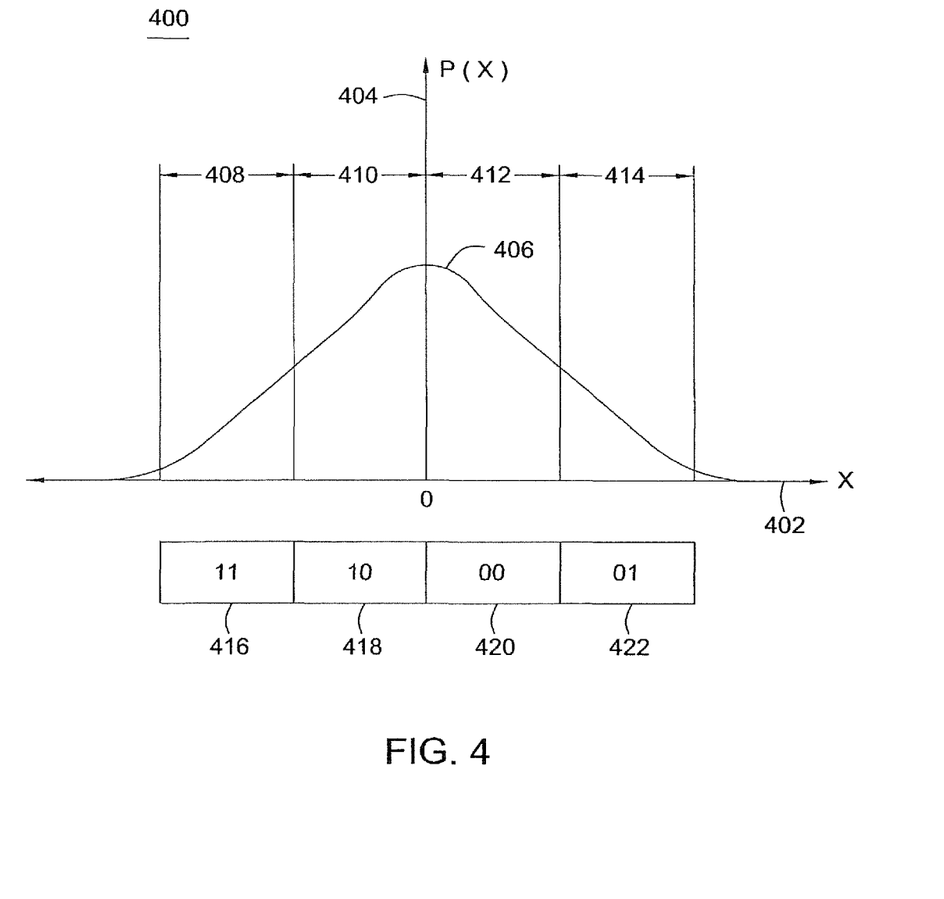
FIG. 4 depicts a graph showing the quantization of a nominal probability distribution function (PDF) for the level of an IF signal produced by a satellite signal receiver.

FIG. 4 depicts a graph 400 showing the quantization of a nominal probability distribution function (PDF) 406 for the level of the IF signal. An axis 402 represents the level of the IF signal and an axis 404 represents the probability that the IF signal will have a particular level. In the present example, the IF signal components are digitized, quantized to two bits, and are represented in sign-magnitude format. As such, the I and Q samples may have one of four possible values: negative high ("11"), negative low ("10"), positive low ("00"), and positive high ("01"). The four possible values are illustrated as quantization bins 416 through 422. The PDF 406 is effectively divided into four sections along the axis 402, namely, sections 408 through 414. The sections 408 through 414 respectively correspond to the four possible values of the signal samples. Notably, sections 408 and 414 represent the probability that the least significant bit of a sample (i.e., the magnitude bit) will be logically high ('1'). Sections 410 and 412 represent the probability that the least significant bit (magnitude bit) will be logically low ('0').

Returning to FIG. 3, it is desirable to set the quantizer level (Q) of the N/D converter 310 equal the root-mean-square (RMS) level of the noise. For a nominal probability distribution as illustrated in FIG. 4, setting Q equal to the RMS level of the noise results in approximately 66% of the I and Q samples output from the N/D converter 310 having a low magnitude bit, and approximately 34% of the I and Q samples output from the N/D converter 310 having a high magnitude bit ("target percentage"). The target percentage of low and high magnitude bits is maintained by adjusting the gain of the amplifiers 309 using the AGC circuits 306.

In one embodiment, gain adjustment for the amplifiers 309 is performed by low pass filtering the respective magnitude bit to yield a DC level. The AGC circuits 306 constantly adjust the gain of the amplifiers 309 until the DC level equals a preset level corresponding to the target percentage. That is, the amplifiers 309, the A/D converter 310, and the AGC circuits 306 form a gain control loop. As described below, this gain control loop has a particular time constant that controls its response time when the percentage deviates form the target percentage. If the RMS level of the noise deviates from the value of Q due to interference, for example, the percentage of I and Q samples having a high magnitude bit will deviate from the nominal value of 34%. For example, interference may cause a higher percentage of I and Q samples to have high magnitude bits. Notably, with pulsed or "bursty" cellular transmissions (e.g., TDMA transmissions), the interference condition is temporary and, as such, the deviation in percentage of high versus low magnitude bits is also temporary.

The quantized I and Q signals are further coupled to the counter 304. The counter 304 counts the number of I and Q samples that have high magnitude bits. Notably, the counter 304 may count the number of I samples, the number of Q samples, or both. The output of the counter is coupled to the controller 302. The controller 302 provides a control signal (dump signal) that is used to reset the counter 304. The controller 302 periodically resets the counter 304 such that the counter 304 counts the total number of high magnitude bits over a predefined period ("gating period"). The controller 302 produces the gate signal 208 in response to the percentage of high magnitude bits in a gating period.

In one embodiment, the controller 302 monitors the deviation of the percentage of I and Q samples having a high magnitude bit from the nominal value of 34%. If the percentage deviates beyond a predefined threshold value, the controller 302 gates the accumulation circuitry 214. For example, the controller 302 may gate the accumulation process if the percentage of high magnitude bits reaches 60%. As described above, a deviation of the percentage of high magnitude bits from the nominal value indicates interference. As such, the invention advantageously gates the signal integration process when such interference is detected.

For example, the A/D converter 310 may sample the IF signal components at a sampling rate of 10 MHz. The gating period may be 100 μs. During the 100 μs gating period, the A/D converter 310 will produce 1000 signal samples for each of the I and Q signal components. If there is no interference and the value of Q within the N/D converter 310 is set equal to the RMS level of the noise, the counter 304 will count approximately 340 samples that have high magnitude bits. If there is interference, the counter 304 will count more than 340 samples that have high magnitude bits. If the threshold is set to 60%, then the controller 302 will gate the integration process if the counter 304 counts 600 or more samples having high magnitude bits during any one gating period.

Figure 6:
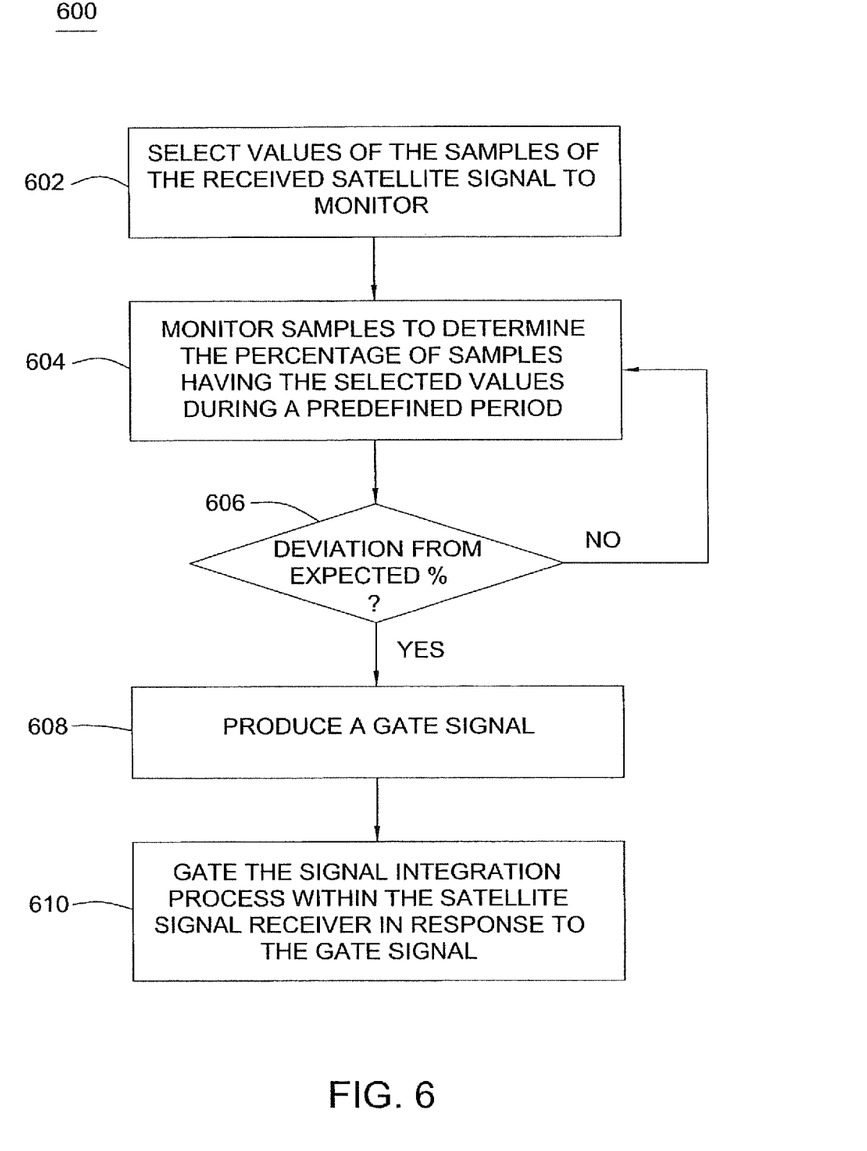
FIG. 6 depicts a flow diagram showing another embodiment of a process for mitigating interference in a satellite signal receiver in accordance with the invention.

FIG. 6 depicts a flow diagram showing another embodiment of a process 600 for mitigating interference in a satellite signal receiver in accordance with the invention. The process 600 begins at step 602, where values of the samples of the received satellite signal are selected for monitoring. In one embodiment, the samples are quantized to two bits and are represented in sign-magnitude format. Values where the magnitude bit is logically high are selected for monitoring. At step 604, the samples are monitored to determine the percentage of samples that have the selected values during a predefined period. At step 606, a determination is made as to whether the percentage determined at step 604 has deviated from an expected percentage. The amount of deviation may be compared to a predefined threshold. If the amount of deviation has not exceeded the threshold, the process 600 returns to step 604. If the percentage determined at step 604 has deviated from an expected percentage by the threshold, the process 600 proceeds to step 608.

In the embodiment described above, the expected percentage of high magnitude bits in the signal samples is approximately 34%. The deviation of the determined percentage may be compared to a threshold of 60%. That is, if 60% or more of the signal samples have high magnitude bits, then the process proceeds to step 608. At step 608, a gate signal is produced. At step 610, the signal integration process within the satellite signal receiver is gated in response to the gate signal.

Returning to FIG. 3, in another embodiment of the invention, the control signal 112 from the wireless processing circuitry 204 is coupled to the controller 302. In this manner, the controller 302 may monitor the transmission state of the wireless transceiver 202 in addition to the output of the counter 304. In one embodiment, the controller 302 gates the accumulation circuitry 214 if both the percentage of high magnitude bits deviates beyond a threshold value and the control signal indicates that the wireless transceiver 202 is transmitting a wireless signal. Alternatively, the controller 302 may gate the accumulation circuitry 214 if either the percentage of high magnitude bits deviates beyond a threshold value or the control signal indicates that the wireless transceiver 202 is transmitting a wireless signal. As such, the invention may perform a combination of the process 500 depicted in FIG. 5 and the process 600 depicted in FIG. 6 to mitigate interference.

Figure 8:
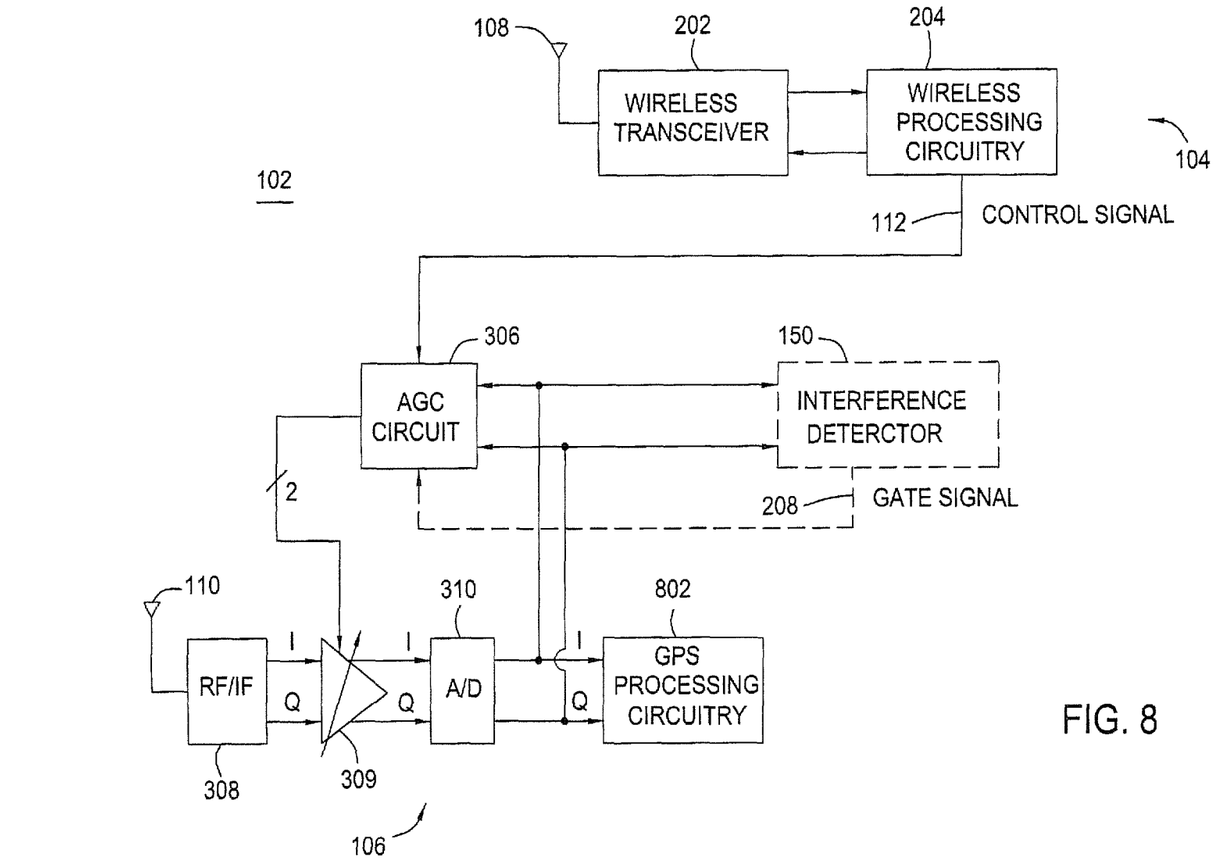
FIG. 8 depicts a block diagram showing yet another embodiment of the mobile device in accordance with the invention.

FIG. 8 depicts a block diagram showing yet another embodiment of the mobile device 102 in accordance with the invention. Elements of FIG. 8 that are the same or similar to those depicted in FIGS. 1 through 3 are designated with identical reference numerals and are described above. For clarity, the tuner 312, the NCO 314, the GPS signal processor 212, the accumulation circuitry 214, and the correlation results memory 216 are generally referred to as GPS processing circuitry 802. In addition, amplifiers 309I and 309Q are shown as amplifier 309, and AGC circuits 306I and 306Q are shown as AGC circuit 306. In one embodiment of the invention, the control signal 112 is used to hold the gain of the AGC circuits 306 when the wireless transceiver 202 is transmitting a wireless signal. As discussed above, each of the AGC circuits 306 varies the gain of a respective one of the amplifiers 309 to cause the RMS level of the noise to equal the quantization level of the A/D converter 310. For example, each of the AGC circuits 306 may sense the density of the magnitude bits of the respective quantized I and Q signals to maintain a constant percentage of high magnitude bits. If the AGC circuits 306I and 306Q sense an above nominal number of high magnitude bits, the AGC circuits 306I and 306Q reduce the gain of their respective amplifiers 309I and 309Q. Thus, if there is interference the wireless transceiver, the AGC circuits 306 may significantly reduce the gain in an attempt to maintain the equality between the RMS level of the noise and the quantization level of the A/D converter 310.

Figure 9A:
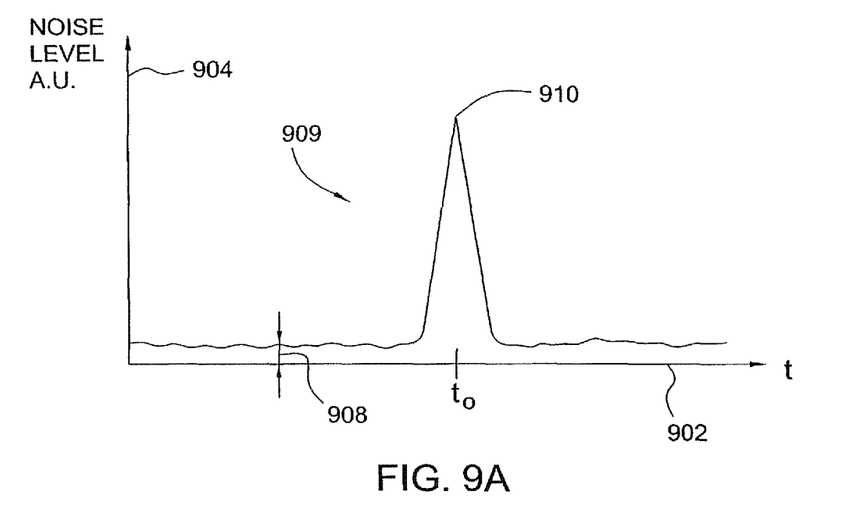
FIGS. 9A and 9B illustrate the effect of noise on the gain of an AGC circuit.
Figure 9B:
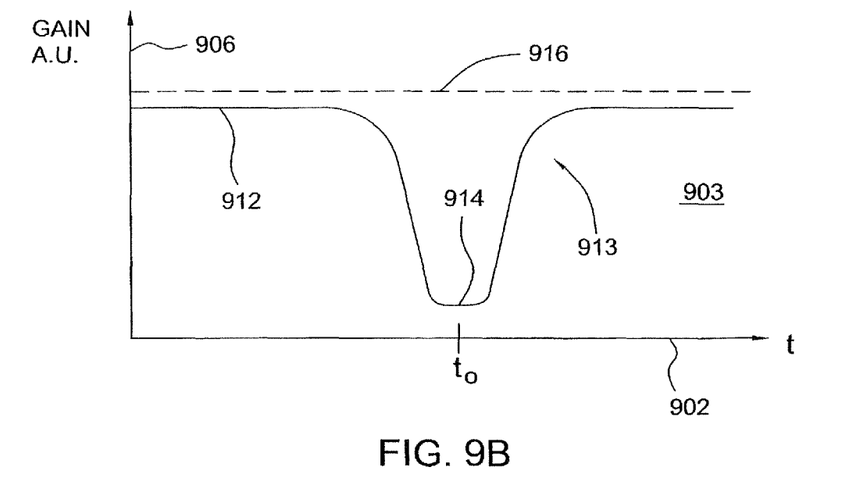

FIGS. 9A and 9B illustrate the effect of noise on the gain of either of the AGC circuits 306. Specifically, FIG. 9A depicts a curve 901 showing noise level versus time, where axis 902 represents time and axis 904 represents the noise level in arbitrary units (a.u.). A nominal noise level is indicated by reference numeral 909. The curve 901 includes a spike 910 near time $t_0$, which may be due to cross-interference or neighborhood interference, as discussed above. FIG. 9B depicts a graph 903 showing amplifier gain versus time, where axis 906 represents gain in a.u., and the time axis is common with the axis 902 of FIG. 9A. A curve 913 shows the amplifier gain versus time for a conventional GPS receiver. A nominal gain value is indicated by reference numeral 912. The curve 913 includes a dip 914 near time $t_0$, where the noise spike 910 occurs.

Returning to FIG. 8, when either of the AGC circuits 306 significantly reduces the gain due to interference, there is a time constant associated with the return to nominal gain. Since the received satellite signals have low signal levels with respect to the background noise, it is desirable to maintain high gain. As such, the control signal 112 is used to hold the gain of the amplifiers 309 when the wireless transceiver 202 is transmitting a wireless signal. Notably, the feedback to each of the AGC circuits 306 is ignored and the gain settings of the AGC circuits 306 are held at whatever values the gain settings were before the interference condition. In this manner, the amplifiers 309 provide a constant gain during an interference condition. This is illustrated in FIG. 9B by a curve 916. Notably, the curve 916 remains at a constant gain during the noise spike 910. In practice, the gain of the amplifiers 309 may be held for much longer than the duration of the interference condition (e.g., in TDMA systems where the wireless transceiver transmits bursts of data).

In another embodiment, the gate signal 208 generated by the interference detector 150 may be used to hold the gain setting of the AGC circuits 306 during an interference condition. Notably, when the interference detector 150 detects a deviation in the target percentage of high magnitude bits versus low magnitude bits, the interference detector 150 holds the gain setting of the AGC circuits 306 using the gate signal 208. When the target percentage of high magnitude bits versus low magnitude bits is again observed by the interference detector, the AGC circuits 306 are released.

In yet another embodiment, rather than holding the gain settings of the AGC circuits 306 during an interference condition, the gain settings may be driven to a predetermined value. Notably, either the control signal 112 or the gate signal 208 may be used to indicate an interference condition and cause the AGC circuits 306 to drive the amplifiers 309 to a pre-defined gain. When the interference condition subsides, the AGC circuits 306 may then be released using either the control signal 112 or the gate signal 208.

Figure 10:
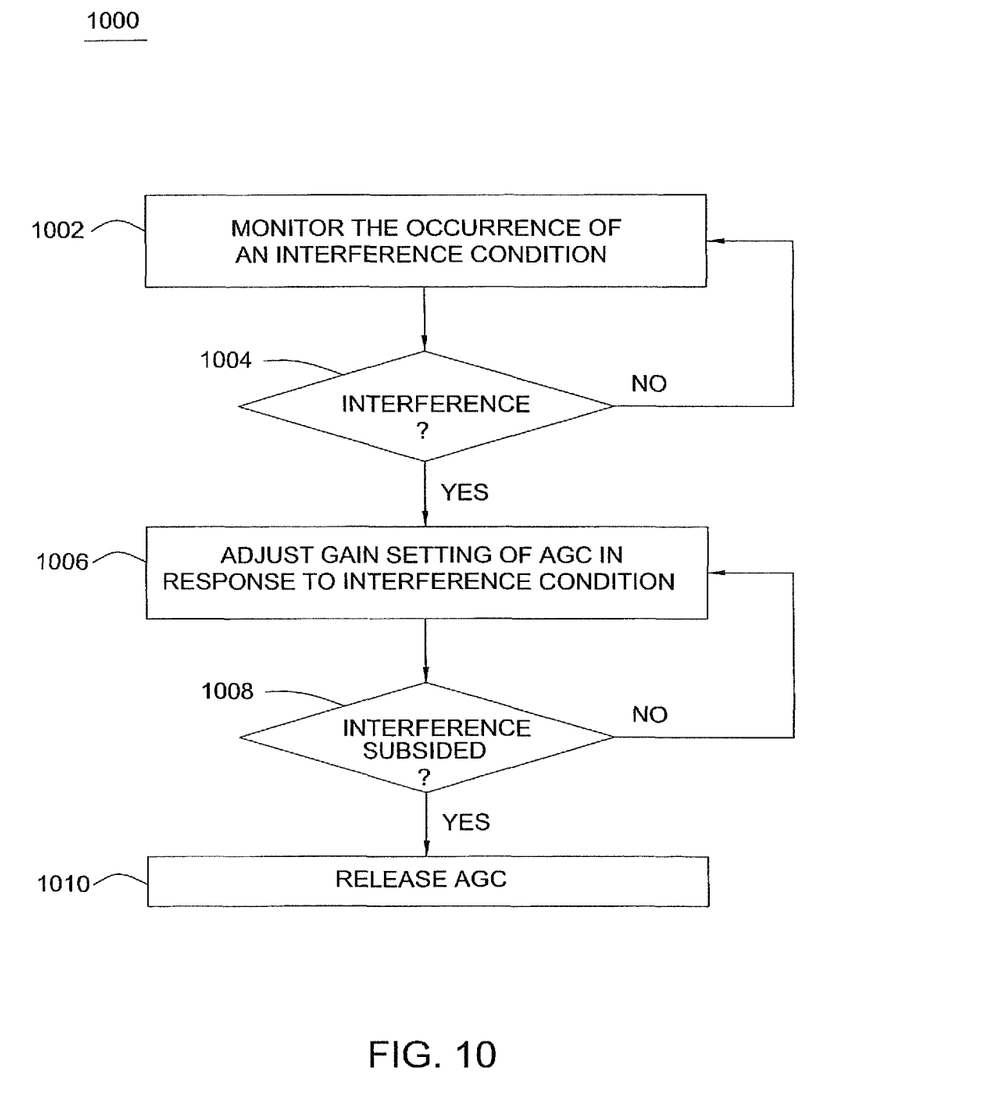
FIG. 10 depicts a flow diagram showing a process for adjusting gain of an AGC circuit within a GPS receiver during an interference condition in accordance with the invention.

FIG. 10 depicts a flow diagram showing a process 1000 for adjusting gain of amplifiers within a GPS receiver during an interference condition in accordance with the invention. The process 1000 begins at step 1002, where the occurrence of an interference condition is monitored. At step 1004, a determination is made as to whether an interference condition has occurred. In one embodiment, the occurrence of an interference condition may be determined in accordance with a control signal generated by a wireless transceiver operating in proximity to the GPS receiver. In another embodiment, the occurrence of an interference condition may be determined in accordance with a gate signal from an autonomous interference detector within the GPS receiver.

If, at step 1004, an interference condition has occurred, the process 1000 proceeds to step 1006. Otherwise, the process 1000 returns to step 1002. At step 1006, the gain settings of the AGC circuits are adjusted in response to the interference condition. In one embodiment, the gain settings of the AGC circuits are held at whatever value they were before the interference condition. In another embodiment, the gain settings of the AGC circuits are driven to pre-defined values. At step 1008, a determination is made as to whether the interference condition has subsided. If so, the process 1000 proceeds to step 1010. Otherwise, the process 1000 returns to step 1006. At step 1010, the AGC circuits are released.

In another embodiment of the invention, the AGC adjustment process 1000 may be used in combination with a process of gating signal integration, such as the process 500 depicted in FIG. 5 or the process 600 depicted in FIG. 6. Notably, the signal integration process may be gated using the control signal and/or the gate signal, and the gain settings of the AGC circuits may be adjusted using the control signal and/or the gate signal.

Although the methods and apparatus of the invention have been described with reference to GPS satellites, it will be appreciated that the teachings are equally applicable to positioning systems that utilize pseudolites or a combination of satellites and pseudolites. Pseudolites are ground-based transmitters that broadcast a PN code (similar to the GPS signal) that may be modulated on an L-band carrier signal, generally synchronized with GPS time. The term "satellite", as used herein, is intended to include pseudolites or equivalents of pseudolites, and the term "GPS signals", as used herein, is intended to include GPS-like signals from pseudolites or equivalents of pseudolites.

Moreover, in the preceding discussion, the invention has been described with reference to application upon the United States Global Positioning System (GPS). It should be evident, however, that these methods are equally applicable to similar satellite systems, and in particular, the Russian Glonass system and the European Galileo system. The term "GPS" used herein includes such alternative satellite positioning systems, including the Russian Glonass system and the European Galileo system.

While the foregoing is directed to illustrative embodiments of the present invention, other and further embodiments of the invention may be devised without departing from the basic scope thereof, and the scope thereof is determined by the claims that follow.

The invention claimed is:

1. A method of mitigating interference in a satellite signal receiver receiving satellite signals from a plurality of satellites, comprising:
monitoring a data transmission of a wireless transceiver operating in proximity to the satellite signal receiver;
transmitting a control signal to the satellite signal receiver upon occurrence of the data transmission from the wireless transceiver, the control signal including information indicative of signal power associated with the data transmission;
driving a gain setting of an automatic gain control (AGC) block to a non-zero predefined value in response to the control signal;
disabling satellite signal integration in response to an indication by the control signal of the signal power exceeding a predefined threshold; and
enabling the satellite signal integration in response to an indication by the control signal of the signal power being below the predefined threshold.

2. The method of claim 1, wherein the
control signal has a first state associated with the signal power exceeding the predefined threshold, and a second state associated with the signal power being below the predefined threshold.

3. The method of claim 1, further comprising:
gating accumulation of satellite signal correlations over a predefined period.

4. The method of claim 3, wherein the gating accumulation of satellite signal correlations comprises:
gating accumulation of in-phase satellite signal correlations and quadrature phase satellite signal correlations over the predefined period.

5. The method of claim 3, wherein the gating accumulation of satellite signal correlations comprises:
gating accumulation of values indicative of a magnitude or a power of the satellite signal correlations over the predefined period.

6. The method of claim 1, further comprising:
holding the gain setting in response to the control signal.

7. The method of claim 1, wherein the gating comprises:
gating accumulation of successive sets of satellite signal correlations over a predetermined interval.

8. A method of mitigating interference in a satellite signal receiver receiving satellite signals from a plurality of satellites, comprising:
selecting a value of a satellite signal sample from a plurality of possible values;
monitoring a percentage of satellite signal samples corresponding to the selected value over a predefined period;
disabling accumulation of magnitudes of satellite signal correlations over the predefined period within the satellite signal receiver in response to the percentage exceeding a predefined threshold; and
enabling the accumalation of magnitudes of the satellite signal correlations over the predefined period in response to the percentage being below the predefined threshold.

9. The method of claim 8, wherein the selecting comprises:
selecting the value having a sign bit and a magnitude bit.

10. The method of claim 8, wherein the selecting comprises:
selecting the value having a logically high magnitude bit.

11. The method of claim 8, wherein the predefined threshold is 60%.

12. The method of claim 8, further comprising:
monitoring a data transmission of a wireless transceiver operating in proximity to the satellite signal receiver; and
transmitting a control signal to the satellite signal receiver upon occurrence of the data transmission from the wireless transceiver, and
wherein the disabling further comprises:
disabling the accumulation in response to:
the percentage exceeding the predefined threshold; and receipt of the control signal.

13. The method of claim 8, further comprising:
holding a gain setting of an automatic gain control (AGC) block in response to the percentage exceeding the predefined threshold.

14. The method of claim 8, further comprising:
driving a gain setting of an automatic gain control (AGC) block to a predefined value in response to the percentage exceeding the predefined threshold.

15. A satellite signal receiver, comprising:
a front end configured to receive satellite signals from a plurality of satellites and to produce baseband signals;
an automatic gain control (AGC) block configured to control a gain of the front end;
a signal processor configured to produce satellite signal correlations between the baseband signals and pseudo-random reference codes;
an accumulator configured to accumulate the satellite signal correlations; and
a controller configured to:

receive a control signal upon occurrence of a data transmission from a wireless transceiver operating in proximity to the satellite signal receiver;

provide a gate signal to the accumulator in response to the control signal, the control signal including information indicative of a signal power of the data transmission; and enable the AGC block to drive the gain to a non-zero predefined value;

wherein the accumulator is further configured to disable accumulation of the satellite signal correlations in response to the control signal indicating that the signal power exceeds a predefined threshold, and to enable the accumulation of the satellite signal correlations in response to the control signal indicating that the signal power is below the predefined threshold.

16. The satellite signal receiver of claim 15, wherein the control signal further enables the AGC block to hold the gain.

17. A satellite signal receiver, comprising:

A Radio Frequency/Intermediate Frequency (RF/IF) converter configured to filter and frequency translate received satellite signals to form IF signals;

an analog-to-digital converter configured to digitize the IF signals;

a tuner configured to produce baseband signals from the digitized IF signals;

a signal processor configured to produce satellite signal correlations between the baseband signals and pseudo-random reference codes;

an accumulator configured to accumulate the satellite signal correlations;

a counter configured to count satellite signal samples of the digitized IF satellite signals having a value selected from a plurality of possible values; and a controller configured to monitor a percentage of the satellite signal samples corresponding to the selected value over a predefined period and to provide a gate signal to the accumulator in response to the percentage exceeding a predefined threshold, wherein the accumulator is further configured to disable accumulation of the satellite signal correlations upon receipt of the gate signal.

18. The satellite signal receiver of claim 17, wherein the controller is further configured to receive a control signal upon occurrence of a data transmission from a wireless transceiver operating in proximity to the satellite signal receiver and to provide the gate signal to the accumulator in response to the control signal.

19. The satellite signal receiver of claim 17, further comprising:

an automatic gain control (AGC) block configured to control a gain of the RF/IF converter, wherein the gate signal enables the AGC block to hold the gain.

20. The satellite signal receiver of claim 17, further comprising:

an automatic gain control circuit (AGC) block configured to control a gain of the RF/IF converter, wherein the gate signal enables the AGC block to drive the gain to a predefined value.

21. The satellite signal receiver of claim 17, wherein the accumulator is further configured to stop accumulation of the satellite signal correlations such that the gated correlations are not accumulated with previous satellite signal correlations.

* * * * *